United States Patent [19]

Suroff

[11] Patent Number: 4,888,969
[45] Date of Patent: Dec. 26, 1989

[54] WHEEL LOCKING APPARATUS

[76] Inventor: Hyman Suroff, c/o Abe Woliner, 189 Midfield Rd., Colonia, N.J. 07067

[21] Appl. No.: 231,347

[22] Filed: Aug. 12, 1988

[51] Int. Cl.$^4$ ............................................. B60R 25/00
[52] U.S. Cl. ..................................... 70/226; 70/259; 29/525.1
[58] Field of Search ............. 70/15, 18, 211, 225–227, 70/237, 259, 260; 29/525.1; 188/32

[56] References Cited

U.S. PATENT DOCUMENTS

| 2,722,822 | 11/1955 | Thomas | 70/259 X |
| 2,844,954 | 7/1958 | Marugg | 70/225 |
| 2,960,857 | 11/1960 | Winter | 70/225 X |
| 3,907,072 | 9/1975 | Shafer | 70/226 X |
| 3,995,461 | 12/1976 | Hudson | 70/225 |

FOREIGN PATENT DOCUMENTS

| 227102 | 9/1962 | Australia | 70/259 |
| 2091182 | 7/1982 | United Kingdom | 70/226 |

Primary Examiner—Robert L. Wolfe
Attorney, Agent, or Firm—Sachs & Sachs

[57] ABSTRACT

A wheel locking apparatus for hampering the rotation of a vehicle wheel is mounted on the vehicle by utilizing a pair of mounting wheel studs and its locking nuts, includes a pair of rods extending beyond the diameter of the wheel that are connected by rods spaced therebetween. Hinges are provided on the ends of the elongated members affixed to the wheel studs which has disposed thereon a pair of pivotable arm means which may be pivoted into a closed position and locked with a key device.

9 Claims, 2 Drawing Sheets

WHEEL LOCKING APPARATUS

BACKGROUND OF THE INVENTION

1. Field of the Invention

The present invention relates to wheel locking devices, and in particular, relates to a wheel locking apparatus that mounts upon a pair of threaded wheel studs that mount the wheel to the vehicle.

2. Discussion of the Relevant Art

The prior art abounds with devices for preventing motor vehicles from moving once a locking apparatus is placed thereon in order to provide the owner of the vehicle from moving the vehicle once the device is installed. Some of these devices are elaborate, expensive and do damage to the tire of the vehicle should the owner thereof attempt to move the vehicle once the apparatus has been installed. Typical of these devices are U.S. Pat. No. 2,960,857 issued to C. A. Winter on Nov. 22, 1960; U.S. Pat. No. 3,907,072 issued to K. A. Shafer on Sept. 23, 1975; and U.S. Pat. No. 3,995,461 issued to K. P. Hudson on Dec. 7, 1976.

All of these devices, however, provide clamps which extend around the vehicle wheel and have various drawbacks. Generally the device is made of many parts which cause delay in installing. Installation is frequently resulting in cumbersome manipulation of various parts. Furthermore, known devices cannot be adjusted and installed on all wheel sizes. Thus, operators of parking lots, officers of law, or car owners who decide to prevent theft of vehicles for various reasons are in need of a simple, inexpensive device to prevent the movement of as vehicle.

SUMMARY OF THE INVENTION

Therefore, it is an object of the present invention to provide a wheel locking apparatus to hamper the rotation of a vehicle wheel, which may be quickly installed and overcome the drawbacks of presently known devices.

It is another object of the present invention to provide a wheel locking apparatus which is comprised of a minimum number of parts and is inexpensive to manufacture.

It is yet another object of the present invention to provide a simple wheel locking apparatus that is capable of being installed in a minimum of time.

A wheel locking apparatus for hampering rotation of a wheel which is mounted on a vehicle, according to the principle of the present invention, on a pair of threaded wheel studs and which overcomes the shortcomings of the prior art, includes first and second elongated members which have one end adapted to extend beyond the circumferential edge of the vehicle wheel and includes connecting rods positioned along the length of the elongated members. Hinges are provided on the other end of each of the elongated members and include a flat portion having first through apertures adapted to receive the wheel mounting studs therethrough and a second through aperture disposed on a plane perpendicular to the first through aperture. A pair of arms have hinge portions adapted to cooperate with the second through aperture of the hinges and include a tamperproof bar, which, in its closed position, covers the mounting stud of the vehicle once the nut is disposed thereon. Additionally included is a key lock disposed proximate the distal edge remote from the hinge on one of the pivotal arms, which cooperates with the second pivotal arm in the closed position, and with the lock rotated to its second or locked position prevents the wheel locking apparatus from being removed from the wheel of the vehicle.

The foregoing and other objects and advantages will appear from the description to follow. In the description, reference is made to the accompanying drawings which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the spirit and scope of the invention. The following detailed description is, therefore, not to be taken in a limiting sense, and the scope of the present invention is best defined by the appended claims.

DESCRIPTION OF THE DRAWINGS

In order that the invention may be more fully understood it will now be described, by way of example, with reference to the accompanying drawing in which.

DESCRIPTION OF THE PREFERRED EMBODIMENTS

Figure 1:
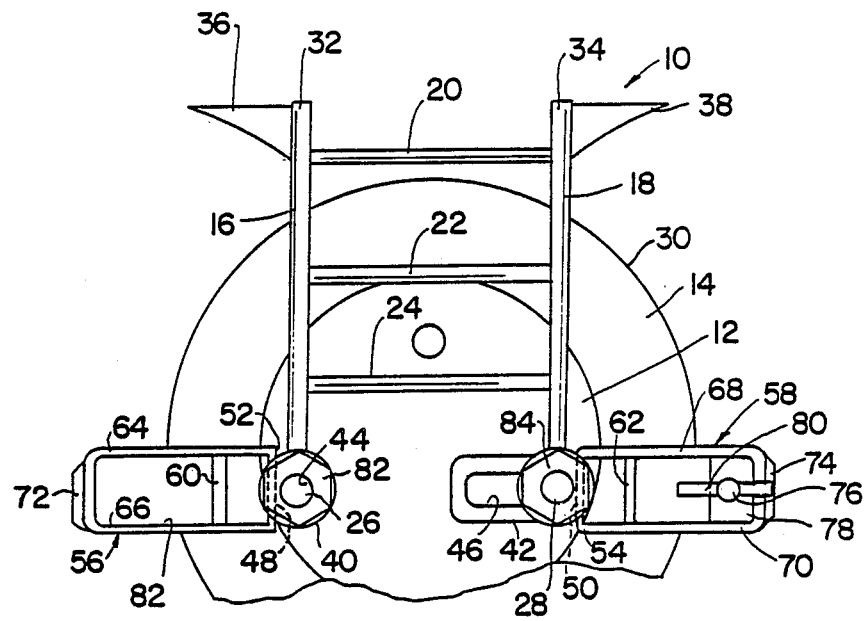
FIG. 1 is a partial view in elevation of the wheel locking apparatus according to the principals of the invention, with the arms pivoted to an open position.
Figure 2:
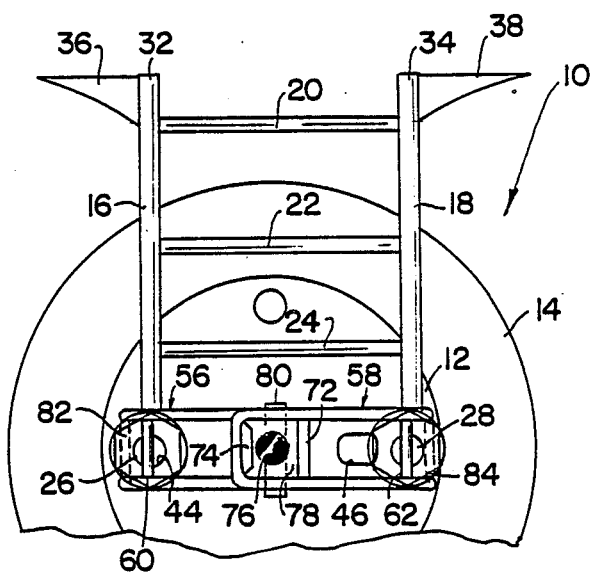
FIG. 2 is a view in elevation of the apparatus shown in FIG. 1 with the arms pivoted to a closed position and the key lock in its locked position.
Figure 3:
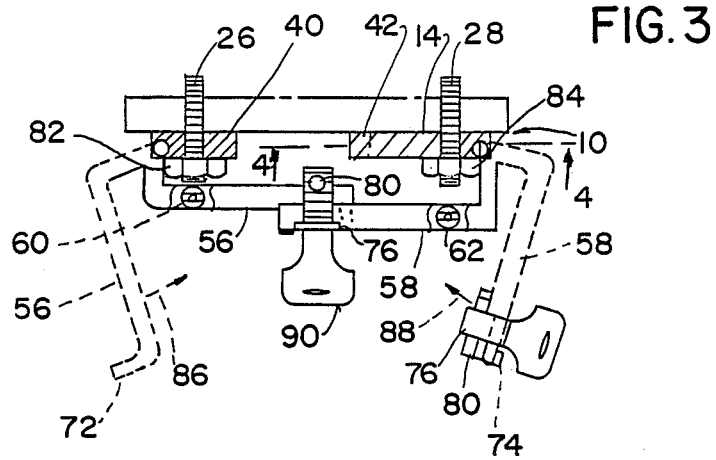
FIG. 3 is a partial top plan view of the apparatus of FIG. 1 showing the arms rotating from an open to a closed position.

Referring now to the figures, and in particular to FIGS. 1, 2, and 3, there is shown a wheel locking apparatus 10 which is affixed to a wheel 12 having a tire 14 mounted thereon. The wheel 12 is affixed on a vehicle, not shown, in a conventional manner. The wheel locking apparatus 10 includes a pair of elongated members 16 and 18 disposed essentially parallel to each other and a plurality of rods or bars 20, 22, and 24 are preferably disposed equally spaced along the length of the elongated members 16 and 18. Members 16 and 18 are selected to extend from the threaded wheel studs 26 and 28 beyond the circumferential edge 30 of the tire 14. The extending ends 32 and 34 of members 16 and 18 may be provided with transversely extending members or chocks 36 and 38 in order to make it more difficult for the wheel to rotate on a flat surface, as shown in FIG. 1.

Hinges 40 and 42 are preferably welded to elongated members 16 and 18 on the distal edge remote from edge 32 and 34. The hinge 40 and 42 is preferrably fabricated in a flat configuration and each is provided with a first through aperture 44 and 46 adapted to receive therein the conventional threaded wheel studs provided on vehicles for the mounting of wheels thereon. The outwardly extending portion of the hinges 40 and 42 are provided with second through apertures 48 and 50 which are located in a plane transverse to through apertures 44 and 46. Apertures 48 and 50 are adapted to receive therein portions 52 and 54 of arms 56 and 58, respectively. Arms 56 and 58 may be fabricated with a hollow center and preferably are rectangularly-shaped having a tamperproof bar 60 and 62 disposed between wall members 64 and 66; and 68 and 70, of arms 56 and 58, respectively. When the arms 56 and 58 are pivoted to the closed position, bars 60 and 62 are positioned directly above wheel studs 26 and 28, as is shown in the FIG. 2. Preferably, arm 56 is provided with a downwardly extending, protruding portion 72 and arm 58 is provided with a downwardly extending, protruding portion 74 remote from the hinges 40 and 42, whose function will be described hereinafter.

Figure 4:
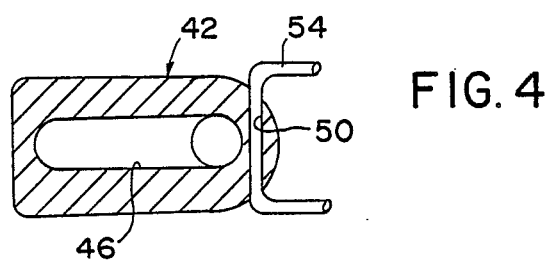
FIG. 4 is a view taken along the line 4—4 of FIG. 3.

The hinge 42 is shown more clearly in FIG. 4 which is taken along line 4—4 of FIG. 3 and shows the first through aperture 46 as being elongated to allow for the variations in the distance between the threaded vehicle mounting studs and thus can readily accommodate most vehicles.

The arm 58 is also provided with a cylinder key lock 76 mounted on a plate 78, preferably welded between wall member 68 and 70 in a conventional manner. The key lock 76 is provided with an extending pin member 80 that is positioned to rotate from a first position, wherein it is essentially parallel to wall members 68 and 70, to a second position (when the key lock 76 is turned to its locked position), wherein it is perpendicular to its wall members 68 and 70. In its first position, extending pin 80 is readily received into the opening 82 of arm 56 when arm 56 and arm 58 are moved to their closed position. Rotating pin 80 to its locked position causes the pin 80 to extend beyond the wall members 64 and 66 of arm 56, thereby preventing the arms 56 and 58 from being moved to their open position and thus maintains arms 56 and 58 in a locked positions as shown in FIG. 2.

FIG. 2 shows the wheel locking apparatus 10 in its fully closed and locked position on a wheel 12 and, because of the extending protrusion 72 and 74 provided on arms 56 and 58 together with tamperproof bars 60 and 62, it can be seen that access to the wheel nuts 80 and 84 is impossible. How this is accomplished is readily shown in FIG. 3, wherein the arms 56 and 58 are moved in the direction of arrows 86 and 88 to place them in their closed or locked position. Utilizing the key 90 to rotate the cylinder lock 76 from its first position to its second position maintains arms 56 and 58 in an intertwined position. The key lock 76 is disposed between the surface of wall members 68 and 70 and, thus, if anyone should attempt to damage the lock with the aid of a chisel, would not be able to obtain a surface upon which the lock could be attacked. In a like manner, tamperproof bars 60 and 62 are disposed directly above wheel studs 26 and 28 thus, making tampering or removing wheel nuts 82 and 84, impossible.

Figure 5:
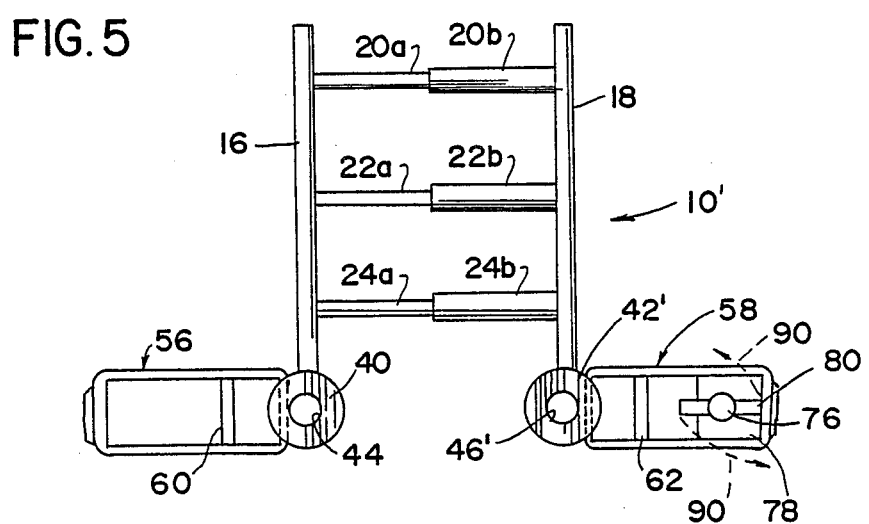
FIG. 5 is a view in elevation of an alternative embodiment of the invention.

An alternate embodiment of the wheel locking apparatus 10 is shown in FIG. 5 and like numerals have been utilized to designate like members. Where variations or modifications to members have been disclosed, prime numbers have been used to indicate the similarity of the members or a letter appearing after the numeral indicates a variation in the construction of the member. Thus, the rods or bars 20, 22, and 24 of the alternative embodiment disclosed in FIG. 5 are designated 20a and 20b; 22a and 22b; and 24a and 24b and indicate that in this embodiment the function of solid rods 20, 22, and 24 may be accomplished by telescoping member 20a into 20b; member 22a into 22b; and 24a into 24b, thereby allowing for variations in the distance between wheel nuts appearing on different vehicles. Hinges 40 and 42, are similar to hinges 40 and 42, respectively, and may be moved to accomodate the varying distances between the vehicle mounting wheel studs. The arms 56 and 58 are the same in both embodiments and it is to be noted that lock 76 is shown with the extending pin 80 in its first or engaging position and is rotated in the direction of arrows 90 when it is rotated to its second or locked position.

In operation, a pair of wheel nuts 82 and 84 are removed from the vehicle upon which the wheel locking apparatus 10 or 10, is to be installed. Apertures 44 and 46 or 46' are adapted to receive the vehicle wheel studs 26 and 28 therein. Thereafter, wheel nuts 82 and 84 are replaced onto the wheel studs 26 and 28 and securely tightened. Arms 56 and 58 are rotated and pivoted to their closed position as shown in FIG. 3 and thereafter key 90 is rotated to cause extending pin 80 to engage and lock arms 56 and 58 in their closed position.

Hereinbefore has been disclosed a wheel locking apparatus which is simple to install and inexpensive to manufacture. It will be understood that various changes in the details, materials and arrangements of parts and operating conditions which have been herein described and illustrated in order to explain the nature of the invention may be made by those skilled in the art within the principles and scope of the instant invention.

Having thus set forth the nature of the invention, what is claimed is:

1. A wheel locking apparatus for hampering rotation of a wheel, which is mounted on a vehicle by a plurality of threaded studs and cooperating wheel nuts, said locking apparatus being mounted on a pair of said wheel studs, comprising:
   (a) first and second elongated member means having,
       (i) one end adapted to extend beyond the circumferential edge of said vehicle wheel, and
       (ii) connecting means disposed along the length of said elongated member means;
   (b) hinge means, said hinge means being disposed upon the the other end of each of said first and second elongated member means, said hinge means having;
       (i) a flat portion with a first through aperture disposed therein adapted to receive said wheel studs therethrough, and
       (ii) a second through aperture disposed in a plane perpendicular to said first through aperture;
   (c) first pivotable arm means, said first arm means including,
       (i) a first hinge portion adapted to cooperate with said second through aperture of one of said hinge means,
       (ii) first tamperproof bar means, said first tamperproof bar means covering one of said pair of threaded mounting wheel studs when pivoted to a closed position; and
   (d) second pivotable arm means, said second pivotable arm means having,
       (i) a second hinge portion adapted to cooperate with said second through aperture of the other of said hinge means,
       (ii) locking means disposed proximate the distal edge remote from said second hinge portion of said second pivotable arm means, and
       (iii) second tamperproof bar means, said second tamperproof bar means covering the other of said pair of mounting wheel studs.

2. A wheel locking apparatus according to claim 1 wherein said connecting means disposed between said first and second member means are telescoped and adapted to adjust to the distance between said first and second member means.

3. A wheel locking apparatus according to claim 1 wherein said connecting means comprises a plurality of solid bars equally spaced along the length of said first and second member means.

4. A wheel locking apparatus according to claim 1 wherein said first and second pivotable arm means are hollow.

5. A wheel locking apparatus according to claim 1 wherein one of said first through apertures is elongated to accomodate different distances between said threaded wheel studs of said vehicle.

6. A wheel locking apparatus according to claim 1 wherein said locking means includes a cylinder key lock having a transverse extending pin adapted to cooperate with and be received through said first pivotable arm means in a first position, said extending pin being moved into a second position to prevent said extending pin from exiting said first pivotable arm means when said key lock is moved to a locked position.

7. A wheel locking apparatus according to claim 1 wherein said one end of said first and said second elongated member means additionally includes transversely extending means.

8. The method of hampering the rotation of a wheel mounted on a vehicle by threaded studs and cooperating wheel nuts, comprising the steps of:
 (a) removing two generally opposing wheel nuts from a pair of wheel studs on said vehicle wheel to be hampered;
 (b) providing a wheel locking apparatus according to claim 1;
 (c) inserting said first through apertures onto said pair of wheel studs;
 (d) replacing and tightening said removed wheel nuts;
 (e) pivoting said first arm means to the closed position;
 (f) pivoting said second said arm means to the closed position, with a locking means extending pin being received by said first arm means; and
 (g) rotating a locking means key lock and said extending pin to its locked position.

9. The method according to claim 8 wherein rotating said locking means key lock to its locked position is accomplished with a key and includes the further step of;
 (h) removing said key from said key lock means.

* * * * *